(12) United States Patent
Heim

(10) Patent No.: US 9,007,669 B2
(45) Date of Patent: Apr. 14, 2015

(54) SECURITY ELEMENT AND METHOD FOR PRODUCING THE SAME

(75) Inventor: Manfred Heim, Bad Tolz (DE)

(73) Assignee: Giesecke & Devrient GmbH, Munich (DE)

( * ) Notice: Subject to any disclaimer, the term of this patent is extended or adjusted under 35 U.S.C. 154(b) by 366 days.

(21) Appl. No.: 12/865,474

(22) PCT Filed: Feb. 3, 2009

(86) PCT No.: PCT/EP2009/000686
§ 371 (c)(1),
(2), (4) Date: Jul. 30, 2010

(87) PCT Pub. No.: WO2009/100831
PCT Pub. Date: Aug. 20, 2009

(65) Prior Publication Data
US 2011/0007374 A1   Jan. 13, 2011

(30) Foreign Application Priority Data
Feb. 15, 2008  (DE) .......................... 10 2008 009 296

(51) Int. Cl.
*G03H 1/00* (2006.01)
*B42D 15/00* (2006.01)
*G03H 1/02* (2006.01)

(52) U.S. Cl.
CPC .......... *B42D 15/0013* (2013.01); *G03H 1/0244* (2013.01); *G03H 1/0011* (2013.01); *B42D 2035/24* (2013.01); *B42D 2035/22* (2013.01)

(58) Field of Classification Search
CPC . G03H 1/0011; G03H 1/0244; G03H 1/0256; G03H 1/0252; G03H 1/028; G03H 2250/10; G03H 2250/12; B42D 15/105
USPC ..................... 359/2, 569, 584, 586; 283/86
See application file for complete search history.

(56) References Cited

U.S. PATENT DOCUMENTS

| | | | |
|---|---|---|---|
| 3,858,977 A | 1/1975 | Baird et al. | |
| 5,331,443 A | 7/1994 | Stanisci | |
| 5,492,370 A * | 2/1996 | Chatwin et al. | 283/110 |
| 5,815,292 A * | 9/1998 | Walters | 359/2 |
| 6,761,959 B1 | 7/2004 | Bonkowski et al. | |
| 6,982,832 B2 * | 1/2006 | Wild et al. | 359/586 |

(Continued)

FOREIGN PATENT DOCUMENTS

| | | |
|---|---|---|
| CN | 1976816 A | 6/2007 |
| DE | 102004039355 A1 | 2/2006 |

(Continued)

OTHER PUBLICATIONS

International Search Report, International Application No. PCT/EP2008/010742, 2 pages, Jul. 10, 2009.

(Continued)

*Primary Examiner* — Audrey Y Chang
(74) *Attorney, Agent, or Firm* — Lathrop & Gage LLP

(57) ABSTRACT

The present invention relates to a security element (12) for protecting valuable articles, having
a thin-film element (30) that has a color-shift effect and that includes an absorber layer (36) having gaps (38) in the region of which no color-shift effect is perceptible, and
a relief pattern (26) that is arranged only in gapped absorber layer regions (38) below the thin-film element (30).

27 Claims, 4 Drawing Sheets

(56) References Cited

U.S. PATENT DOCUMENTS

Figure 1:
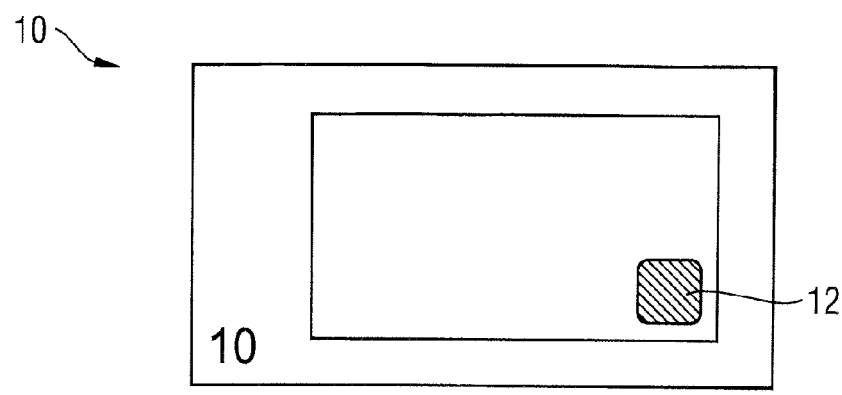

| | | | |
|---|---|---|---|
| 6,987,590 B2 | 1/2006 | Phillips et al. | |
| 7,029,745 B2 | 4/2006 | Bonkowski et al. | |
| 7,224,528 B2 * | 5/2007 | Phillips et al. | 359/584 |
| 7,297,292 B2 * | 11/2007 | Hammond-Smith et al. | 252/299.01 |
| 7,667,894 B2 | 2/2010 | Hoffmuller | |
| 7,728,931 B2 | 6/2010 | Hoffmuller | |
| 7,808,605 B2 | 10/2010 | Hoffmuller | |
| 7,986,459 B2 | 7/2011 | Kaule | |
| 8,083,894 B2 | 12/2011 | Gruszczynski | |
| 8,149,511 B2 | 4/2012 | Kaule | |
| 2005/0128543 A1 | 6/2005 | Phillips et al. | |
| 2005/0141094 A1 | 6/2005 | Wild et al. | |
| 2005/0151368 A1 * | 7/2005 | Heim | 283/72 |
| 2005/0168723 A1 | 8/2005 | Schilling et al. | |
| 2006/0077496 A1 | 4/2006 | Argoitia et al. | |
| 2007/0165182 A1 | 7/2007 | Hoffmuller et al. | |
| 2007/0211238 A1 | 9/2007 | Hoffmuller | |
| 2007/0216518 A1 | 9/2007 | Hoffmuller | |
| 2007/0229928 A1 | 10/2007 | Hoffmuller | |
| 2007/0241553 A1 | 10/2007 | Heim et al. | |
| 2007/0246933 A1 | 10/2007 | Heim | |
| 2007/0273142 A1 | 11/2007 | Tompkin et al. | |
| 2007/0274559 A1 | 11/2007 | Depta | |
| 2008/0014378 A1 | 1/2008 | Hoffmuller | |
| 2008/0054621 A1 | 3/2008 | Burchard | |
| 2008/0079257 A1 | 4/2008 | Fessl | |
| 2008/0088859 A1 | 4/2008 | Depta | |
| 2008/0160226 A1 | 7/2008 | Kaule | |
| 2008/0163994 A1 | 7/2008 | Hoppe | |
| 2008/0198468 A1 | 8/2008 | Kaule | |
| 2008/0216976 A1 | 9/2008 | Ruck | |
| 2008/0250954 A1 | 10/2008 | Depta | |
| 2008/0258456 A1 | 10/2008 | Rahm | |
| 2009/0001709 A1 | 1/2009 | Kretschmar | |
| 2009/0008923 A1 | 1/2009 | Kaule | |
| 2009/0008926 A1 | 1/2009 | Depta | |
| 2009/0102605 A1 | 4/2009 | Kaule | |
| 2009/0115185 A1 | 5/2009 | Hoffmuller et al. | |
| 2009/0236061 A1 | 9/2009 | Gruszczynski | |
| 2009/0297805 A1 | 12/2009 | Dichtl | |
| 2009/0322071 A1 | 12/2009 | Dichtl | |
| 2010/0175843 A1 | 7/2010 | Gregarek | |
| 2010/0177094 A1 | 7/2010 | Kaule | |
| 2010/0182221 A1 | 7/2010 | Kaule | |
| 2010/0194091 A1 | 8/2010 | Heim | |
| 2010/0194532 A1 | 8/2010 | Kaule | |
| 2010/0196587 A1 | 8/2010 | Keller | |
| 2010/0207376 A1 | 8/2010 | Heim | |
| 2010/0208036 A1 | 8/2010 | Kaule | |
| 2010/0307705 A1 | 12/2010 | Rahm | |
| 2010/0308570 A1 | 12/2010 | Heim | |
| 2010/0320742 A1 | 12/2010 | Hoffmuller | |
| 2011/0007374 A1 | 1/2011 | Heim | |
| 2011/0012337 A1 | 1/2011 | Heim | |
| 2011/0027538 A1 | 2/2011 | Hoffmann | |
| 2011/0045248 A1 | 2/2011 | Hoffmuller | |
| 2011/0069360 A1 | 3/2011 | Dichtl | |
| 2011/0079997 A1 | 4/2011 | Heim | |
| 2011/0091665 A1 | 4/2011 | Heim | |
| 2011/0095518 A1 | 4/2011 | Hoffmuller | |
| 2011/0101670 A1 | 5/2011 | Heim | |
| 2011/0109078 A1 | 5/2011 | Hoffmuller | |
| 2011/0114733 A1 | 5/2011 | Heim | |
| 2011/0157183 A1 | 6/2011 | Kaule | |
| 2012/0126525 A1 | 5/2012 | Dorfler | |
| 2012/0168515 A1 | 7/2012 | Schutzmann | |
| 2012/0170124 A1 | 7/2012 | Fuhse | |

FOREIGN PATENT DOCUMENTS

| | | |
|---|---|---|
| DE | 102004051919 A1 | 4/2006 |
| DE | 102006015023 A1 | 10/2007 |
| EP | 1 003 126 A2 | 5/2000 |
| EP | 1 203 968 A1 | 5/2002 |
| EP | 1 047 549 B1 | 3/2003 |
| EP | 0 733 919 B1 | 9/2003 |
| EP | 0 911 758 B1 | 11/2005 |
| EP | 1 628 147 A1 | 2/2006 |
| EP | 1 715 392 A1 | 10/2006 |
| EP | 1 503 907 B1 | 1/2007 |
| JP | 2003326876 A | 11/2003 |
| JP | 2008083599 A | 4/2008 |
| WO | WO 01/03945 A1 | 1/2001 |
| WO | WO 01/53113 A1 | 7/2001 |
| WO | WO 02/00445 A1 | 1/2002 |
| WO | WO 02/00446 A1 | 1/2002 |
| WO | WO 03/095228 A1 | 11/2003 |
| WO | WO 03/095657 A2 | 11/2003 |
| WO | WO 2005/038136 A1 | 4/2005 |
| WO | WO 2005/105474 A2 | 11/2005 |
| WO | WO 2005/105475 A1 | 11/2005 |
| WO | WO 2005/108108 A2 | 11/2005 |
| WO | WO 2006/040069 A1 | 4/2006 |
| WO | WO 2007/051529 A1 | 5/2007 |
| WO | WO 2007/138293 A2 | 12/2007 |

OTHER PUBLICATIONS

International Preliminary Report on Patentability, International Application No. PCT/EP2008/010742, 6 pages, Aug. 3, 2010, English Translation.

International Search Report, International Application No. PCT/EP2008/010740, 3 pages, Apr. 23, 2009.

International Preliminary Report on Patentability, International Application No. PCT/EP2008/010740, 6 pages, Nov. 22, 2010, English Translation.

International Search Report, International Application No. PCT/EP2009/000686, 2 pages, Sep. 18, 2009.

International Preliminary Report on Patentability, International Application No. PCT/EP2009/000686, 6 pages, Sep. 7, 2010, English Translation.

International Search Report, International Application No. PCT/EP2009/001094, 2 pages, Jul. 10, 2009.

International Preliminary Report on Patentability, International Application No. PCT/EP2009/001094, 9 pages, Nov. 2, 2010.

* cited by examiner

SECURITY ELEMENT AND METHOD FOR PRODUCING THE SAME

CROSS-REFERENCE TO RELATED APPLICATIONS

This application is the U.S. National Stage of International Application No. PCT/EP2009/000686, filed Feb. 3, 2009, which claims the benefit of German Patent Application DE 10 2008 009 296.7, filed Feb. 15, 2008, both of which are hereby incorporated by reference to the extent not inconsistent with the disclosure herewith.

The present invention relates to a security element for securing valuable objects, a method for manufacturing such a security element, as well as a security paper and a data carrier having such a security element.

For protection, data carriers, such as value or identification documents, but also other valuable articles, such as branded articles, are often provided with security elements that permit the authenticity of the data carrier to be verified, and that simultaneously serve as protection against unauthorized reproduction. Such security elements can be developed, for example, in the form of a security thread embedded in a banknote, a cover foil for a banknote having a hole, an applied security strip, a self-supporting transfer element, or also in the form of a feature region applied directly to a value document.

Security elements that display viewing-angle-dependent visual effects play a special role in safeguarding authenticity, as these cannot be reproduced even with the most modern copiers. For this, the security elements are furnished with optically variable elements that, from different viewing angles, convey to the viewer a different image impression and, depending on the viewing angle, display for example another color or brightness impression and/or another graphic motif.

In this connection, it is known to use security elements having multilayer thin-film elements whose color impression for the viewer changes with the viewing angle, and when the security feature is tilted, shifts for example from green to blue, from blue to magenta or from magenta to green. The occurrence of such color changes upon tilting a security element is referred to in the following as a color-shift effect.

Based on that, it is the object of the present invention to further improve a security element of the kind cited above, and especially to create a security element having an attractive visual appearance and high counterfeit security.

This object is solved by the security element having the features of the main claim. A method for manufacturing such a security element, a security paper and a data carrier are specified in the coordinated claims. Developments of the present invention are the subject of the dependent claims.

According to the present invention, a security element of the kind cited above includes
- a thin-film element that has a color-shift effect and that includes an absorber layer having gaps in the region of which no color-shift effect is perceptible, and
- a relief pattern that is arranged only in gapped absorber layer regions below the thin-film element.

Here, the present invention is based on the idea of avoiding any reciprocal visual influencing of, on the one hand, the color-shift effect of the thin-film element, and on the other hand, the optically variable effect of the relief pattern, in that the relief pattern is arranged only below gaps in the absorber layer of the thin-film element. In particular, the relief pattern and the gaps in the absorber layer are arranged stacked in perfect register, while no relief pattern is present outside the gapped absorber layer regions. For the visual impression of a perfect registration, it is then not required, according to the present invention, to arrange the thin-film element itself in register with the relief pattern. At the same time, the color-shift effect of the thin-film element and the optically variable effect of the relief pattern can be perceived independently of one another and free of interference.

The gaps in the absorber layer are preferably present in the form of characters, patterns or codes.

The relief pattern is preferably present in an embossing lacquer layer. Here, the relief pattern can constitute a diffractive pattern, such as a hologram, a holographic grating image or a hologram-like diffraction pattern, or also an achromatic pattern, such as a matte pattern having a non-colored, silvery matte appearance, a micromirror arrangement, a blaze lattice having a sawtooth-like groove profile or a Fresnel lens arrangement. The dimensions of the pattern elements of the diffractive relief patterns are usually on the order of the wavelength of light, in other words normally between 300 nm and 1 μm. Some relief patterns exhibit also smaller pattern elements, such as subwavelength gratings or moth-eye patterns whose pattern elements can also be smaller than 100 nm. In some cases, the pattern elements of achromatic microrelief patterns are also larger than 1 μm, the dimensions of micromirrors or blaze lattice lines range, for example, up to a height of about 15 μm and a lateral dimension of about 30 μm.

In an advantageous variant of the present invention, the thin-film element exhibits a reflection layer, an absorber layer and a dielectric spacing layer disposed between the reflection layer and the absorber layer. In such thin-film elements, the color-shift effect is based on viewing-angle-dependent interference effects due to multiple reflections in the different sub-layers of the element. On one hand, the path difference of the light reflected at the different layers depends on the optical thickness of the dielectric spacing layer, which determines the distance between the absorber layer and the reflection layer, and on the other hand, it varies with the respective viewing angle.

Since the path difference lies in the magnitude of the wavelength of the visible light, due to destructive interference and amplification of certain wavelengths, an angle-dependent color impression results for the viewer. Through suitable choice of material and thickness of the dielectric spacing layer, a number of different color-shift effects can be designed, for example tilt effects, in which the color impression changes with the viewing angle from green to blue, from blue to magenta or from magenta to green.

Here, the thin-film element can advantageously be arranged over the relief pattern in the sequence reflection layer, dielectric spacing layer and absorber layer. Alternatively, the thin-film element is arranged over the relief pattern in the sequence absorber layer, dielectric spacing layer and reflection layer. The latter layer structure is suitable especially for security elements that are to be viewed from the bottom, in other words the reverse of the substrate foil, while the first-mentioned layer structure is suitable especially for security elements that are viewed from the top.

The reflection layer of the thin-film element is preferably formed by an opaque or by a semi-transparent metal layer, especially composed of aluminum. As the reflection layer, also a layer that is magnetic at least in some areas can be used, such that a further authenticity feature can be integrated without requiring an additional layer in the layer structure.

The reflection layer can further exhibit gaps in the form of patterns, characters or codes that form transparent or semi-transparent regions in the thin-film element. In the transparent or semi-transparent gapped regions, the viewer is presented with a conspicuous contrast to the surrounding color effects.

In particular, the patterns, characters or codes can light up brightly in transmitted light when the thin-film element is applied to a transparent or translucent substrate. The gaps in the reflection layers can also be designed like a grid, preferably having a low areal fraction of 40% or less, such that they practically do not attract attention in reflected light and appear only in transmitted light.

According to another, likewise advantageous variant of the present invention, the thin-film element can also be formed by two absorber layers and a dielectric spacing layer lying therebetween. Also thin-film elements such as these display a color-shift effect, but are not opaque, such that the color-shift effect is visible also from the reverse of the security element. In this variant, it is sufficient if one of the absorber layers includes said gaps.

In advantageous modifications of the described variants of the present invention, the thin-film element includes a dielectric spacing layer that is likewise gapped in gapped absorber layer regions. This modification may be considered for all of the above-mentioned layer arrangements of the thin-film element.

In all embodiments, the dielectric spacing layer is preferably produced by a vacuum vapor deposition process. Alternatively, the spacing layer can also be formed by a printing layer or by an ultrathin foil, especially a stretched polyester foil. Presently, an embodiment in which the dielectric spacing layer is formed by a low-index dielectric layer, especially a vapor deposited $SiO_2$ layer or a $MgF_2$ layer, is particularly preferred.

Further details on the structure of such thin-film elements and on the materials and layer thicknesses that are usable for the reflection layer, the dielectric spacing layer and the absorber layer are set forth in publication WO 01/03945, whose disclosure is incorporated in the present application by reference.

In an advantageous development of the present invention, in some regions is arranged over the thin-film element a transparent phase-delay layer that forms a phase-shifting layer for light from the visible wavelength range. Phase-delay layers, which, in the context of this description, are sometimes also called phase-shifting layers, are optically active layers that act on the phase of a transmitted light wave. Here, the sub-beams of an incident polarized light wave acquire, due to different refractive indices, a path difference and thus a phase difference. If the phase difference of the two sub-beams is just a half or quarter wavelength, then so-called $\lambda/2$ or $\lambda/4$ layers are obtained.

In the present invention, the phase delay of the phase-delay layer preferably corresponds to a path difference between about $\lambda/6$ and about $\lambda/2$, particularly preferably between about $\lambda/4$ and about $\lambda/2$. Here, the path difference is specified modulo $\lambda$, in other words in the range between 0 and $\lambda$, since a layer having a path difference of, for example, $5/4*\lambda$ or $9/4*\lambda$ produces the same phase delay as a $\lambda/4$ layer. In the context of the present invention, it is further preferred that the phase-shifting layer is formed from nematic liquid crystal material by and/or that the phase-delay layer is present in the form of patterns, characters or a code.

In a further advantageous embodiment of the present invention, a semi-transparent ink layer is arranged over the thin-film element, the color impression of the thin-film element upon viewing under predetermined viewing conditions being adapted to the color impression of at least one sub-region of the semi-transparent ink layer. Here, the semi-transparent ink layer can be arranged both over gapped regions and over non-gapped regions of the thin-film element.

In a spectral range in which the color impression of the thin-film element is adapted to the color impression of the semi-transparent layer, the semi-transparent ink layer preferably exhibits a transmittance between 30% and 95%, particularly preferably between 60% and 95%, and very particularly preferably between 80% and 95%.

The semi-transparent ink layer can be applied in different ways, advantageously it is imprinted, for example in a screen printing, intaglio printing, flexographic printing or other suitable printing method. Here, the semi-transparent ink layer can be imprinted directly on the thin-film element, but there can also be provided between the ink layer and the thin-film element transparent intermediate layers that act, for example, as a protective layer or an adhesive layer. Such transparent intermediate layers can also be provided between the ink layer and the above-mentioned phase-delay layer.

To introduce additional features into the security element, in preferred embodiments, the semi-transparent ink layer is present in the form of characters, patterns or codes. This also includes embodiments in which the ink layer exhibits gaps in the form of characters, patterns or codes.

In particularly preferred embodiments, the semi-transparent ink layer is chosen such that it substantially preserves the polarization state of light passing through from the visible wavelength range. In this way, the patterns, characters or codes formed by the phase-delay layer can be made equally visible in both the color-variable and the color-constant regions, as explained below in greater detail.

The semi-transparent ink layer can also exhibit multiple sub-regions having different color impressions, the color impression of the thin-film element upon viewing under predetermined viewing conditions being adapted, in this case, to the color impression of at least one of the sub-regions. A particularly appealing effect can be achieved if the thin-film element and the semi-transparent ink layer are coordinated with one another in such a way that, when the security element is viewed vertically, the color impression of the thin-film element substantially corresponds to the color impression of at least one sub-region of the semi-transparent ink layer. When viewed vertically, which often occurs when a security element applied to a valuable article is first perceived, the color-variable and color-constant regions then initially impart substantially the same color impression. When the security element is tilted, the color impression changes in the color-variable regions while it remains unchanged in the covered, color-constant regions.

The security element is preferably a security thread, a security band, a security strip, a patch or a label for application to a security paper, value document or the like. It is understood that the security element can also exhibit further layers, such as protective layers or additional effect layers having other security features.

The present invention also includes a method for manufacturing a security element of the kind described, in which an embossing lacquer layer is applied to a substrate, and is embossed in the form of a desired relief pattern in a sub-region, a thin-film element having a color-shift effect is arranged over the embossing lacquer layer, an absorber layer of the thin-film element being provided, in the regions that are provided with the relief pattern, with gaps in the region of which no color-shift effect is perceptible.

In an advantageous method variant, a semi-transparent ink layer is arranged over the thin-film element, the color impression of the thin-film element upon viewing under predetermined viewing conditions being adapted to the color impression of at least one sub-region of the semi-transparent ink layer. Here, the semi-transparent ink layer is advantageously imprinted, especially in the screen printing, intaglio printing, or flexographic printing methods.

In a further advantageous method variant, in some regions is arranged over the thin-film element a transparent phase-delay layer that forms a phase-shifting layer for light from the visible wavelength range. Also the phase-delay layer can advantageously be imprinted on the thin-film element. Alternatively, the phase-delay layer can be applied to a separate substrate foil and transferred to the thin-film element.

In a further alternative, the phase-delay layer is applied to the substrate. Thereafter, this layer is over-coated with an embossing lacquer layer that is embossed in sub-regions. Over that, a thin-film element is applied, preferably vapor deposited.

The present invention further comprises a security paper having a security element of the kind described, as well as a data carrier that is furnished with such a security element. The data carrier can especially be a banknote, a value document, a passport, a certificate or an identification card. The described security elements, security papers or data carriers can especially be used for securing objects of any kind.

Further exemplary embodiments and advantages of the present invention are explained below by reference to the drawings, in which a depiction to scale and proportion was omitted in order to improve their clarity.

Figure 2:
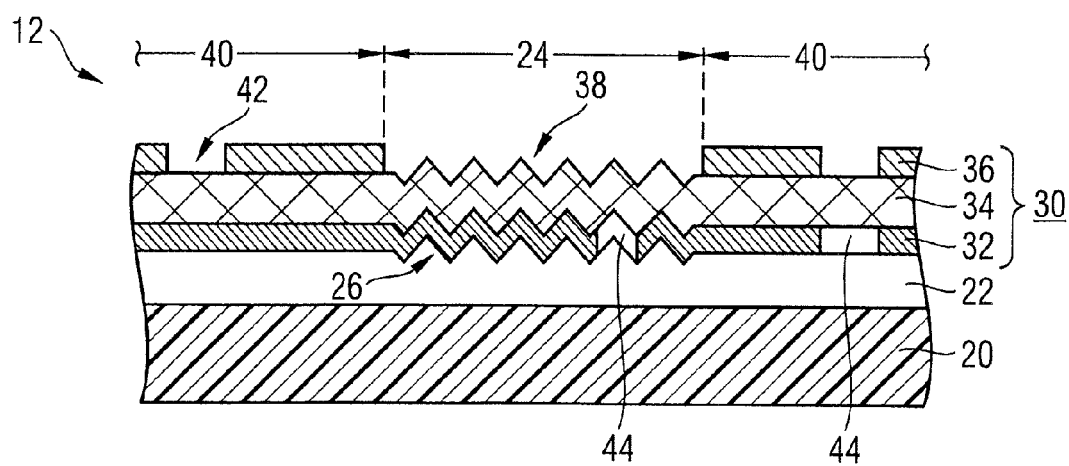
Figure 3:
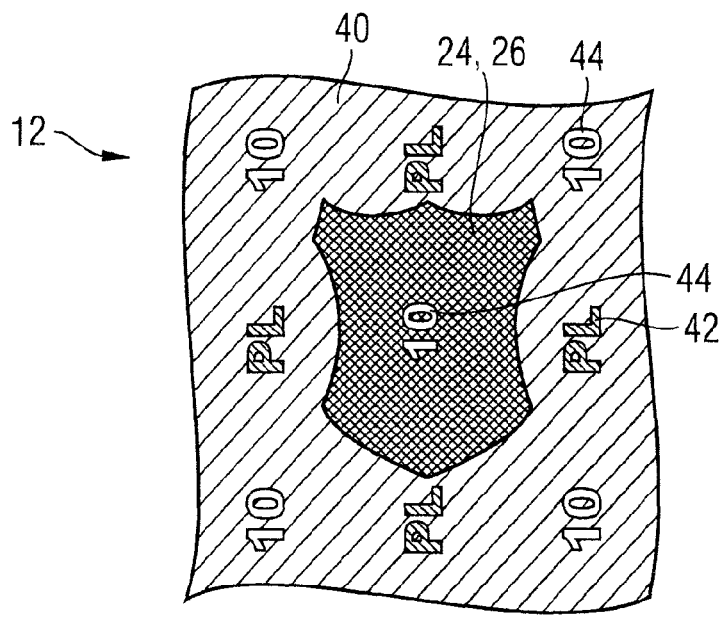
Figure 4:
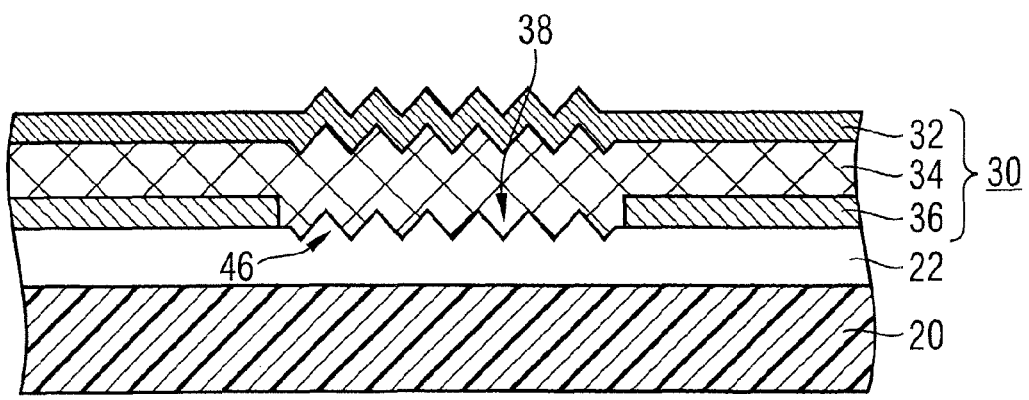
Figure 5A:
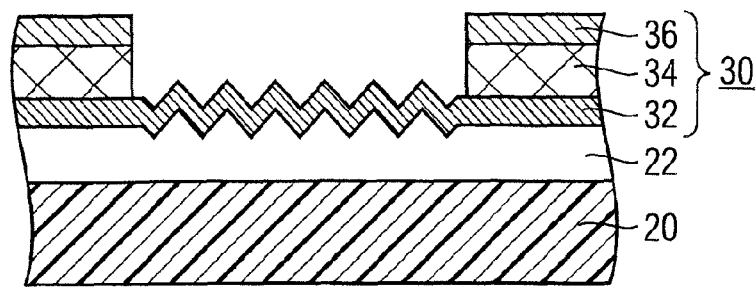
Figure 5B:
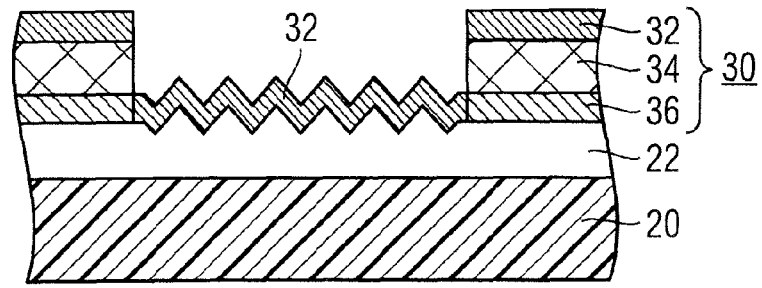
Figure 6:
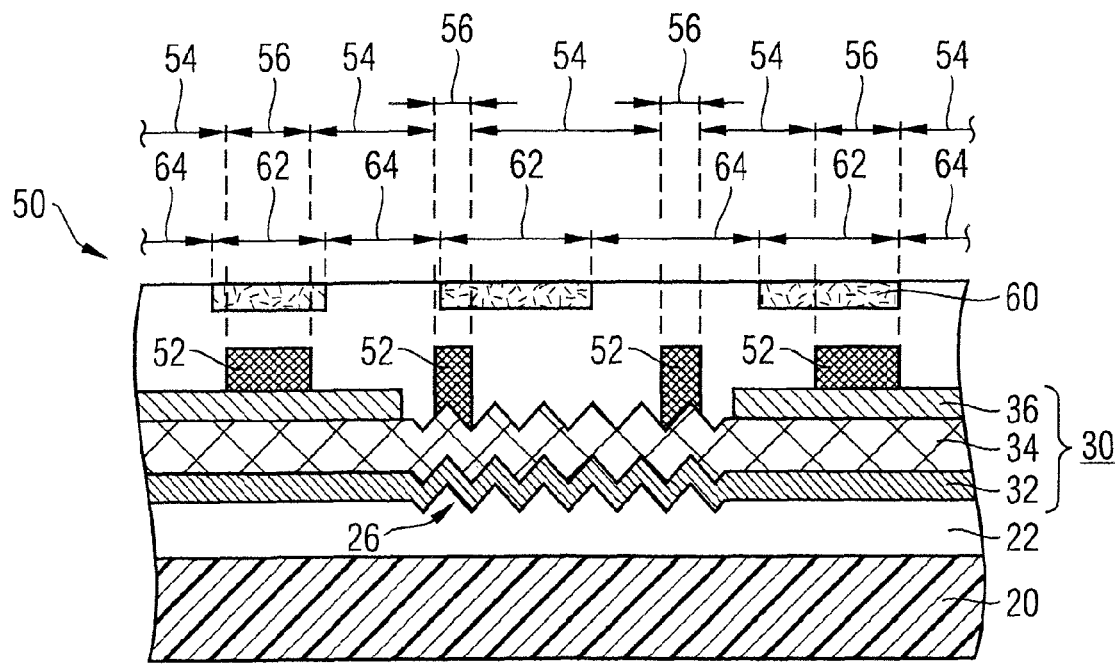
Figure 7A:
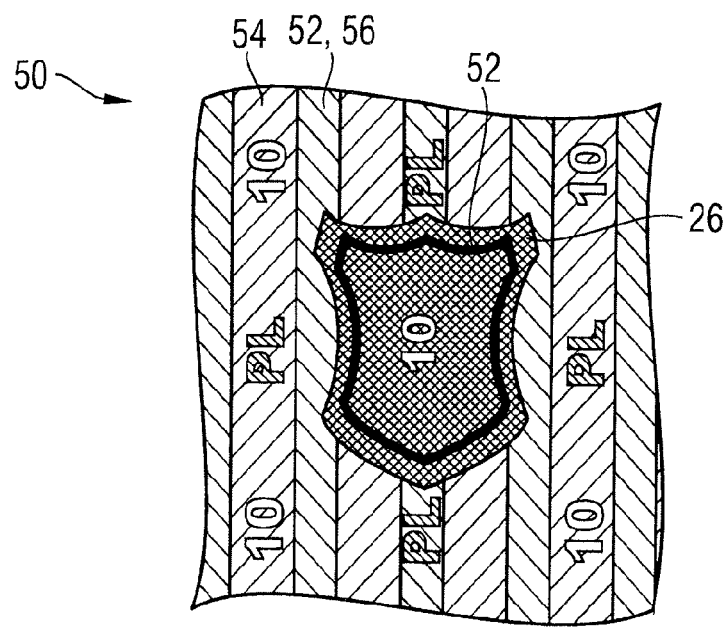

Shown are:

FIG. 1 a schematic diagram of a banknote having a security element according to the present invention, FIG. 2 a cross section through a security element according to an exemplary embodiment of the present invention, FIG. 3 schematically, the visual impression of a security element according to the present invention, in top view, FIG. 4 a cross section through a security element according to another exemplary embodiment of the present invention, FIG. 5 in (a) and (b), modifications of the exemplary embodiments in FIGS. 2 and 4, respectively, FIG. 6 a security element according to a further exemplary embodiment of the present invention, in which the thin-film element and the relief pattern are combined with a semi-transparent ink layer that is applied in some regions and a hidden security feature, and FIG. 7 schematically, the visual impression of the security element in FIG. 6, in (a) when viewed without auxiliary means and in (b) when viewed with a circular polarizer laid on it.

The invention will now be explained using a banknote as an example. For this, FIG. 1 shows a schematic diagram of a banknote 10 having an inventive security element 12 in the form of an affixed transfer element. It is understood that the present invention is not limited to transfer elements and banknotes, but can be used in all types of security elements, for example in labels on goods and packaging or in securing documents, identity cards, passports, credit cards, health cards and the like. In banknotes and similar documents, besides transfer elements, for example also security threads, and in addition to top-view elements, also see-through elements may be used.

The structure of a security element 12 according to the present invention will now be explained in greater detail with reference to FIGS. 2 and 3, where FIG. 2 depicts a cross section through the security element and FIG. 3 shows, schematically, the visual impression of the security element, in top view.

With reference, first, to FIG. 2, the security element 12 includes a substrate foil 20, for example a PET foil, to which a UV-curing embossing lacquer layer 22 is applied. The lacquer layer 22 was then provided, in a sub-region 24, with an embossing in the form of a diffractive relief pattern 26 that, in the exemplary embodiment, constitutes a hologram. In other embodiments, the embossing can also constitute a holographic grating image, a hologram-like diffraction pattern or also an achromatic micropattern having a non-colored, for example silvery matte, appearance.

On the cured lacquer layer 22 having the relief patterns 26 was then arranged, having a color-shift effect, a thin-film element 30 that comprises a reflection layer 32 formed by an opaque aluminum layer, a dielectric $SiO_2$ spacing layer 34 vapor deposited on the reflection layer 32, and a semi-transparent absorber layer 36 composed of chrome. As explained above, the color-shift effect of such a thin-film element 30 is based on interference effects caused by multiple reflections in the sub-layers 32, 34, 36 of the element.

According to the present invention, the absorber layer 36 of the thin-film element 30 exhibits, in the sub-regions 24 in which the relief patterns 26 are present in the embossing lacquer layer 22, substantially congruent gaps 38. In the region of these gaps 38, due to the lack of interference, the thin-film element 30 produces no color-shift effect such that, there, the hologram 26 stands out with its colors uninfluenced by the color-shift effect of the thin-film element 30. Conversely, in the regions 40 outside the sub-regions 24, also the viewing-angle-dependent color impression of the thin-film element is not influenced by the color split of the relief patterns 26. Overall, in this way, a reciprocal interference of the visual appearances of the relief patterns 26 within the sub-regions 24 and the color-shifting regions 40 outside the sub-regions 24 is effectively avoided. At the same time, the color-shifting regions 40 and the color-splitting hologram regions 24, 26 lie next to one another in perfect registration for the viewer, as shown schematically in top view in FIG. 3.

To achieve this effect of perfect registration without reciprocal interference, it is not necessary, according to the present invention, to arrange the thin-film element 30 itself in register with the relief patterns 26. As evident from FIG. 2 and the explanation there, it is, rather, sufficient to provide the gaps 38 in the absorber layer 36 substantially in register with the relief patterns 26.

The manufacture of such a security element 10 can occur, for example, in that a substrate foil 20 is first coated with an embossing lacquer 22 and said embossing lacquer is embossed in a sub-region 24 in the form of the desired relief pattern 26. Over the partially embossed lacquer layer 22 is then contiguously vapor deposited a reflection layer 32, and on this, a dielectric spacing layer 34. A soluble washable ink is imprinted on the spacing layer 34 in the sub-regions 24 and, thereafter, the absorber layer 36 is contiguously vapor deposited on the layer sequence obtained in this way. In a subsequent washing step, in the sub-regions 24 in which washable ink was imprinted, the absorber layer 36 is washed off, together with said washable ink, by a solvent, such that substantially congruent gaps 38 are produced in the sub-regions 24 for embossing 26. Further details on such a washing process can be found in publication WO 99/13157, whose disclosure is incorporated in the present application by reference.

In advantageous embodiments, the absorber layer 36 can exhibit, in addition to the congruent gaps 38, further gaps 42 in non-embossed regions of the lacquer layer 22, for example in the form of a negative lettering, such as the letter sequence "PL" shown in FIG. 3. The view of the metallic reflection layer 32 is revealed in the region of these gaps 42 such that, there, instead of the color-shift effect of the thin-film element 30, the metallic gloss of the reflection layer 32 determines the visual impression.

Also the reflection layer 32 can be provided with gaps 44 within and/or outside the sub-regions 24, especially in the form of characters, patterns or a code, such as the numeric string "10" shown in FIG. 3. In these gapped regions 44, the security element 10 appears to be transparent or translucent, such that, additionally, a conspicuous contrast effect results there in transmitted light.

The thin-film element 30 can also be applied to the embossing lacquer layer with the reverse layer structure, as shown in FIG. 4. In the exemplary embodiment in FIG. 4, a substrate foil 20 is coated with an embossing lacquer 22, and this is embossed in the form of a desired achromatic matte pattern 46 in a sub-region 24. To the partially embossed lacquer layer 22 is applied a thin-film element 30 having the layer sequence absorber layer 36, dielectric spacing layer 34 and reflection layer 32. Here, as described in connection with FIG. 2, the absorber layer is provided, at least in the sub-region 24, with gaps 38, for example with the aid of the washing process already mentioned.

Such security elements having a reverse layer structure of the thin-film element are especially suitable for viewing from the bottom, in other words the reverse of the substrate foil. After the application of the security element in FIG. 4 to a desired data carrier, the substrate foil 20 can also be removed, for example via a suitable release or separation layer. Also in this case, after the transfer, the security element is viewed from the bottom, in other words from the side of the embossing lacquer layer 22. It is understood that, also in the variant of the present invention in FIG. 4, additional gaps 42 in the absorber layer and/or gaps 44 in the reflection layer 32 can be provided, as already described above.

In further variants of the present invention, depicted in FIG. 5, in addition to the absorber layer 36, also the dielectric spacing layer 34 of the thin-film element 30 is gapped in the sub-region 24. Such an additional gap in the spacing layer 34 can be combined both with the variant in FIG. 2 and with the variant in FIG. 4, as shown in FIGS. 5(a) and 5(b), respectively.

In the further exemplary embodiment 50 illustrated in FIGS. 6 and 7, in some regions, a semi-transparent ink layer 52, 52' is arranged over the thin-film element 30 or the embossing lacquer layer 22. Here, the thin-film element 30 and the semi-transparent ink layer 52, 52' are coordinated with each other in such a way that, when viewed at a vertical viewing angle, they evoke substantially the same color impression.

When the security element 50 is tilted, the color impression of the thin-film element 30 changes in the non-covered regions 54 due to the color-shift effect that occurs there, while the color impression in the regions 56 not covered by the ink layer 52, 52' changes only a little or not at all. For example, the thin-film element 30 can be designed such that its color impression changes from magenta when viewed vertically to green when viewed obliquely. Coordinated with this, the semi-transparent ink layer 52, 52' conveys, when viewed vertically, a likewise magenta-colored color impression that, unlike the color impression of the thin-film element 30, remains substantially unchanged when the security element 12 is tilted.

The semi-transparent ink layer can be arranged both over the non-gapped regions of the thin-film element (ink layer regions 52) and in the region of the gaps 38 (ink layer regions 52'). There, too, due to the color split of the hologram 26 in the non-covered regions 54, the color impression of the security element 50 changes upon tilting, while the color impression in the covered regions 52', 56 remains substantially constant. In both cases, the color-constant regions 56 thus form a visually stabilizing influence that stands in contrast to the regions 54 that are color variable upon tilting. The combination of color-variable regions 54 and immediately adjacent, color-constant regions 56 further increases the visual conspicuousness of the color-shift effect of the thin-film element 30, since the human eye reacts more strongly to the occurring color differences than to the color change per se.

In the exemplary embodiment in FIG. 6, the above-described visual effects, which are perceptible without auxiliary means, are combined with a hidden security feature. In addition to the already described elements, the security element 50 includes a transparent phase-delay layer 60 that is arranged in the form of a pattern in some regions 62 over the thin-film element 30.

The phase-delay layer 60 consists of a birefringent material, for example of a nematic liquid crystal material. The layer thickness of the phase-delay layer 60 is typically chosen such that its phase delay corresponds to a path difference between about $\lambda/6$ and about $\lambda/2$, preferably about $\lambda/4$, where $\lambda$ constitutes a wavelength from the visible spectral range.

When the security element 50 is viewed with common unpolarized light and without auxiliary means, the regions 62 having the phase-delay layer 60 are practically not perceptible, since the phase delay of the layer 60 acts equally on all polarization directions of the incident light and its light absorption is negligibly low. From this, the visual impression of the security element 50 depicted schematically in FIG. 7(a) results in top view.

Figure 7B:
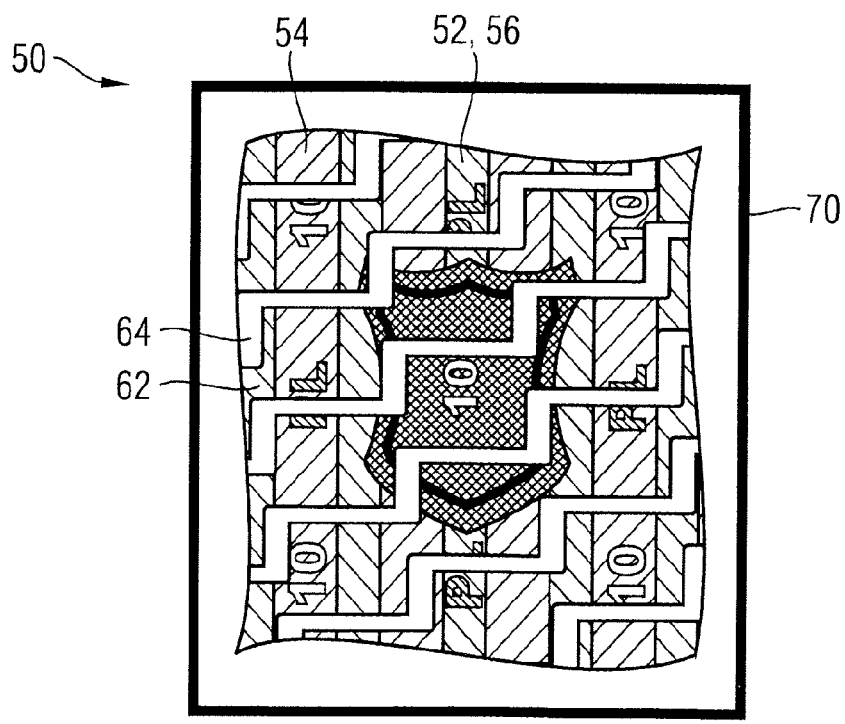

If, in contrast, the security element 50 is viewed with a polarizer 70 laid on it, as shown in FIG. 7(b), then strong contrast differences stand out between the regions 62 having the phase-delay layer and the regions 64 without a phase-delay layer. In this way, the presence and the form of the pattern formed by the regions 62 can be used for an additional authenticity check, for example at the point of sale or in banks.

The operating principle of the hidden security feature will now be explained by way of example based on a $\lambda/4$ phase-delay layer 60 and, laid on it, a circular polarizer 70 that transmits only right-circularly polarized light. Under these conditions, the circular polarizer 70 lets only the right-circularly polarized portion of incident unpolarized light through. In the security element sub-regions 64 without a phase-delay layer 60, the right-circularly polarized light is reflected by the metallic reflector layer 32 of the thin-film element 60 with the reverse polarization direction, in other words as left-circularly polarized light. The reflected left-circularly polarized light is blocked by the circular polarizer 70, such that the sub-regions 64 appear dark for the viewer.

In the sub-regions 62 having a phase-delay layer, the right-circularly polarized light is, in contrast, transformed into linearly polarized light before the reflection at the reflector layer 32 by the phase-delay layer 60. The light that remains linearly polarized after reflection passes through the phase-delay layer 60 anew and, in the process, is transformed into right-circularly polarized light that can easily pass the circular polarizer 70 under the chosen requirements. In the sub-regions 62, the pattern of the open security feature thus appears for the viewer substantially unchanged in brightness.

Here, it is also important that the semi-transparent ink layer 52 largely preserves the polarization state of the penetrating light, such that the pattern 62, 64 formed by the phase-delay layer 60 can be made equally visible in the color-variable and the color-constant regions 54, 56.

The thin-film element can also be developed in the form absorber layer/dielectric layer/absorber layer in all embodiments, with the gaps having to be developed in only one of the absorber layers in order to suppress the color-shift effect there. Also a layer sequence such as this exhibits a color-shift effect, but is not opaque, such that the color-shift effect is visible also from the reverse of the security element. Security elements having such thin-film elements can be used especially in documents having see-through regions.

The mentioned gaps in the reflection layers can also be designed like a grid, preferably having a low areal fraction of 40% or less. The gaps in the reflection layers are then practically not noticeable in reflected light, but rather appear only in transmitted light.

The invention claimed is:

1. A security element for securing valuable articles, having an embossing lacquer layer having a relief pattern,
   a thin-film element having a color-shift effect and including a reflection layer, an absorber layer and a dielectric spacing layer disposed between the reflection layer and the absorber layer, wherein the reflection layer is arranged between the embossing lacquer layer and the dielectric spacing layer,
   wherein the thin-film element is arranged over the embossing lacquer layer in the sequence reflection layer, dielectric spacing layer and absorber layer, thus providing the security element with a layer structure comprising in order the embossing lacquer layer, the reflection layer, the dielectric spacing layer, and the absorber layer;
   wherein the absorber layer of the thin-film element has gaps in the region of which no color-shift effect is perceptible, and
   wherein the relief pattern is arranged only in gap regions of the absorber layer below the thin-film element.

2. The security element according to claim 1, characterized in that the gaps in the absorber layer are present in the form of characters, patterns or codes.

3. The security element according to claim 1, characterized in that the relief pattern constitutes a diffractive pattern, or an achromatic pattern.

4. The security element according to claim 1, characterized in that the thin-film element includes at least a first absorber layer, a second absorber layer and a dielectric spacing layer arranged between the two absorber layers, at least one of the absorber layers including said gaps.

5. The security element according to claim 1, characterized in that in gap regions of the absorber layer, the dielectric spacing layer also has gaps.

6. The security element according to claim 1, characterized in that the thin-film element comprises a reflection layer having gaps in the form of patterns, characters or codes that form transparent or translucent areas in the thin-film element.

7. The security element according to claim 1, characterized in that over the thin-film element is arranged, in some regions, a transparent phase-delay layer that forms a phase-shifting layer for light from the visible wavelength range.

8. The security element according to claim 7, characterized in that the phase-delay layer is present in the form of patterns, characters or a code.

9. The security element according to claim 7, characterized in that the phase delay of the phase-delay layer corresponds to a path difference between $\lambda/6$ and $\lambda/2$ for light from the visible wavelength range.

10. The security element according to claim 7, characterized in that the phase-delay layer forms, at least in sub-regions, a $\lambda/4$ layer for light from the visible wavelength range.

11. The security element according to claim 7, characterized in that the phase-delay layer is formed from nematic liquid crystal material.

12. The security element according to claim 1, characterized in that, in some regions, a semi-transparent ink layer is arranged over the thin-film element, the color impression of the thin-film element when viewed under predetermined viewing conditions being adapted to the color impression of at least one sub-region of the semi-transparent ink layer.

13. The security element according to claim 12, characterized in that, in a spectral range in which the color impression of the thin-film element is adapted to the color impression of the semi-transparent layer, the semi-transparent ink layer exhibits a transmittance between 30% and 95%.

14. The security element according to claim 12, characterized in that the semi-transparent ink layer is present in the form of characters, patterns or codes.

15. The security element according to claim 12, characterized in that the semi-transparent ink layer substantially preserves the polarization state of light from the visible wavelength range passing through.

16. The security element according to claim 12, characterized in that the semi-transparent ink layer comprises multiple sub-regions having different color impressions, and the color impression of the thin-film element when viewed under predetermined viewing conditions is adapted to the color impression of at least one of the sub-regions.

17. A method for manufacturing the security element according to claim 1, comprising the steps in which
   the embossing lacquer layer is applied to a substrate, and is embossed in the form of a relief pattern in a sub-region of the embossing lacquer layer,
   the thin-film element having a color-shift effect is arranged over the embossing lacquer layer, the absorber layer of the thin-film element being provided with gaps in the regions that are provided with the relief pattern.

18. The method according to claim 17, characterized in that, in some regions, a semi-transparent ink layer is arranged over the thin-film element, the color impression of the thin-film element when viewed under predetermined viewing conditions being adapted to the color impression of at least one sub-region of the semi-transparent ink layer.

19. The method according to claim 18, characterized in that the semi-transparent ink layer is imprinted.

20. The method according to claim 17, characterized in that over the thin-film element is arranged, in some regions, a transparent phase-delay layer that forms a phase-shifting layer for light from the visible wavelength range.

21. The method according to claim 20, characterized in that the phase-delay layer is imprinted on the thin-film element.

22. The method according to claim 20, characterized in that the phase-delay layer is applied to a substrate foil and is transferred to the thin-film element.

23. The method according to claim 17, characterized in that a phase-delay layer is applied to the substrate before application of the embossing lacquer layer.

24. A security paper for manufacturing security or value documents, that are furnished with the security element according to claim 1.

25. The security paper according to claim 24, characterized in that the security paper comprises a carrier substrate composed of paper or plastic.

26. A data carrier having the security element according to claim 1.

27. A use of the security element according to claim 1, of a security paper furnished with the security element, or of a data carrier having the security element for securing goods against counterfeiting.

* * * * *